(12) United States Patent
Boudreau et al.

(10) Patent No.: US 8,897,797 B2
(45) Date of Patent: Nov. 25, 2014

(54) SCHEDULING TRANSMISSION OF DATA AT A BASE STATION BASED ON AN INTERFERENCE INDICATOR MESSAGE FROM ANOTHER BASE STATION

(75) Inventors: Gary Boudreau, Kanata (CA); Ning Guo, Kanata (CA); Eric Parsons, Stittsville (CA); Charles Filiatrault, Montreal (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/128,264

(22) PCT Filed: Jan. 29, 2010

(86) PCT No.: PCT/IB2010/000182
§ 371 (c)(1),
(2), (4) Date: May 9, 2011

(87) PCT Pub. No.: WO2010/086734
PCT Pub. Date: Aug. 5, 2010

(65) Prior Publication Data
US 2011/0223929 A1    Sep. 15, 2011

Related U.S. Application Data

(60) Provisional application No. 61/148,223, filed on Jan. 29, 2009.

(51) Int. Cl.
*H04W 72/04* (2009.01)
*H04W 72/12* (2009.01)

(52) U.S. Cl.
CPC ................ *H04W 72/1231* (2013.01)
USPC ........... 455/452.1; 455/63.1; 370/329

(58) Field of Classification Search
CPC . H04W 16/16; H04W 52/143; H04W 52/243; H04W 52/244; H04W 72/0406; H04W 72/0426; H04W 72/082; H04W 72/1278; H04W 92/20

USPC .............. 455/452.1, 63.1, 114.2, 278.1, 296; 370/242, 252, 328–333
See application file for complete search history.

(56) References Cited

U.S. PATENT DOCUMENTS

| | | | | |
|---|---|---|---|---|
| 2002/0131376 | A1* | 9/2002 | Wheatley et al. | 370/328 |
| 2003/0134647 | A1* | 7/2003 | Santhoff et al. | 455/456 |

(Continued)

FOREIGN PATENT DOCUMENTS

| | | |
|---|---|---|
| CN | 1977562 | 6/2007 |
| CN | 101060705 | 10/2007 |

(Continued)

OTHER PUBLICATIONS

International Search Report and Written Opinion dated Jun. 30, 2010 for International Application No. PCT/IB2010/000182, International Filing Date: Jan. 29, 2010 consisting of 9-pages.

(Continued)

*Primary Examiner* — Jinsong Hu
*Assistant Examiner* — Erica Navar
(74) *Attorney, Agent, or Firm* — Meyertons, Hood, Kivlin, Kowert & Goetzel, P.C.

(57) ABSTRACT

A system includes a first base station of a first vendor configuration and a second base station of a second vendor configuration. A link is between the first and second base stations. The first base station is configured to receive at least one interference indicator message from the second base station, and schedule transmission of data based on the at least one interference indicator message. Scheduling the transmission of data includes determining whether to transmit the data using a current resource or to delay transmission of the data.

15 Claims, 3 Drawing Sheets

(56) References Cited

U.S. PATENT DOCUMENTS

| | | | |
|---|---|---|---|
| 2003/0216156 | A1 | 11/2003 | Chun |
| 2007/0105581 | A1* | 5/2007 | Ariyur .......................... 455/522 |
| 2008/0009244 | A1 | 1/2008 | Lee |
| 2008/0043648 | A1 | 2/2008 | Buga et al. |
| 2008/0233916 | A1 | 9/2008 | Wang et al. |
| 2008/0306798 | A1 | 12/2008 | Anke et al. |
| 2009/0161619 | A1* | 6/2009 | Noma ........................... 370/329 |
| 2009/0203372 | A1* | 8/2009 | Horn et al. ................. 455/422.1 |
| 2009/0268684 | A1* | 10/2009 | Lott et al. ...................... 370/329 |
| 2011/0110311 | A1* | 5/2011 | Krause et al. ................. 370/329 |

FOREIGN PATENT DOCUMENTS

| | | |
|---|---|---|
| CN | 101091324 | 12/2007 |
| CN | 101340264 | 1/2009 |
| WO | 2008021785 | 2/2008 |
| WO | 2008047722 | 4/2008 |

OTHER PUBLICATIONS

Office Action from Japanese Patent Application No. 2011-546995, mailed Dec. 9, 2013, English and Japanese Versions, pp. 1-7.
Alcatel-Lucent, "A use case for Max Tx Power per PRB as a eNodeB Measurement", 3GPP TSG RAN WG1 #50 Meeting R1-074260, 3GPP, Oct. 12, 2007, pp. 1-5.
Office Action from Chinese Application No. 201080004306.4, mailed Dec. 26, 2013, English and Chinese versions, pp. 1-21.
Official Action and translation thereof for Russian Patent Application No. 2011120059, Jul. 16, 2013, pp. 1-8.
Vodafone, Telecom Italia; "QoS Support based on Intercell Interference Coordination;" 3GPP TS RAN WG2#60, R2-075030, Jeju, Korea, Nov. 5-9, 2007; pp. 1-2.
Office Action from Chinese Patent Application No. 201080004306.4, mailed Jun. 20, 2013, (English Translation and Chinese Versions), pp. 1-21.

* cited by examiner

SCHEDULING TRANSMISSION OF DATA AT A BASE STATION BASED ON AN INTERFERENCE INDICATOR MESSAGE FROM ANOTHER BASE STATION

CROSS-REFERENCE TO RELATED APPLICATIONS

This application is a Submission Under 35 U.S.C. §371 for U.S. National Stage Patent Application of International Application Number: PCT/IB2010/000182, filed Jan. 29, 2010, entitled "SCHEDULING TRANSMISSION OF DATA AT A BASE STATION BASED ON AN INTERFERENCE INDICATOR MESSAGE FROM ANOTHER BASE STATION," which claims priority to U.S. Provisional Application Ser. No: 61/148,223, filed Jan. 29, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the EUTRA (Evolved Universal Terrestrial Radio Access) standard from 3GPP, which seeks to enhance the UMTS technology. The EUTRA standard is also referred to as the Long Term Evolution (LTE) standard.

In a wireless communications network, there are usually many coverage areas (also referred to as cell sites) each including communications equipment, including base stations. It is possible that a wireless communications network provided by a particular service provider can use equipment from multiple different vendors. In such an arrangement, the overall region serviced by the service provider can include communications equipment made by different vendors. An issue associated with deploying a wireless communications network having equipment from multiple vendors is that there may not be adequate mechanisms in place to mitigate inter-cell interference. Inter-cell interference refers to interference of signaling communicated in a first cell site (having communications equipment of a first vendor)) due to signal transmissions in a second cell site (having communications equipment of a second vendor).

SUMMARY

In general, according to some preferred embodiments, a system includes a first base station having a first vendor configuration, a second base station having a second vendor configuration, and a link between the first and second base stations. The first base station is configured to receive at least one interference indicator message from the second base station, and to schedule transmission of data based on the at least one interference indicator message. Scheduling the transmission of data includes determining whether to transmit the data using a current resource or to delay transmission of the data.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In accordance with some preferred embodiments, a wireless communications network operated by a particular service provider includes communications equipment from multiple different vendors. Such communications equipment includes base stations that are used to perform wireless communications with mobile stations. The base stations associated with different vendors in the wireless communications network include at least a first base station of a first vendor configuration, and a second base station of a second vendor configuration. A base station of a particular vendor configuration refers to a base station that has either or both of software and hardware configured or designed by the particular vendor. Thus, two base stations of different vendor configurations can differ in software components, hardware components, or both software and hardware components. Alternatively, two base stations of different vendor configurations can have the same software and/or hardware arrangements but with different settings.

In the wireless communications network, a link is provided between the base stations having different vendor configurations. Interference indicator messages can be communicated over the link between the base stations having different vendor configurations. Interference indicator messages received by a given base station are used by the given base station to calculate an interference decision metric. Based on the value of the interference decision metric, the base station is able to decide whether or not to schedule transmission of data in a current resource, or to delay the transmission of the data at a future time. In this manner, inter-cell site interference mitigation can be achieved.

Figure 1:
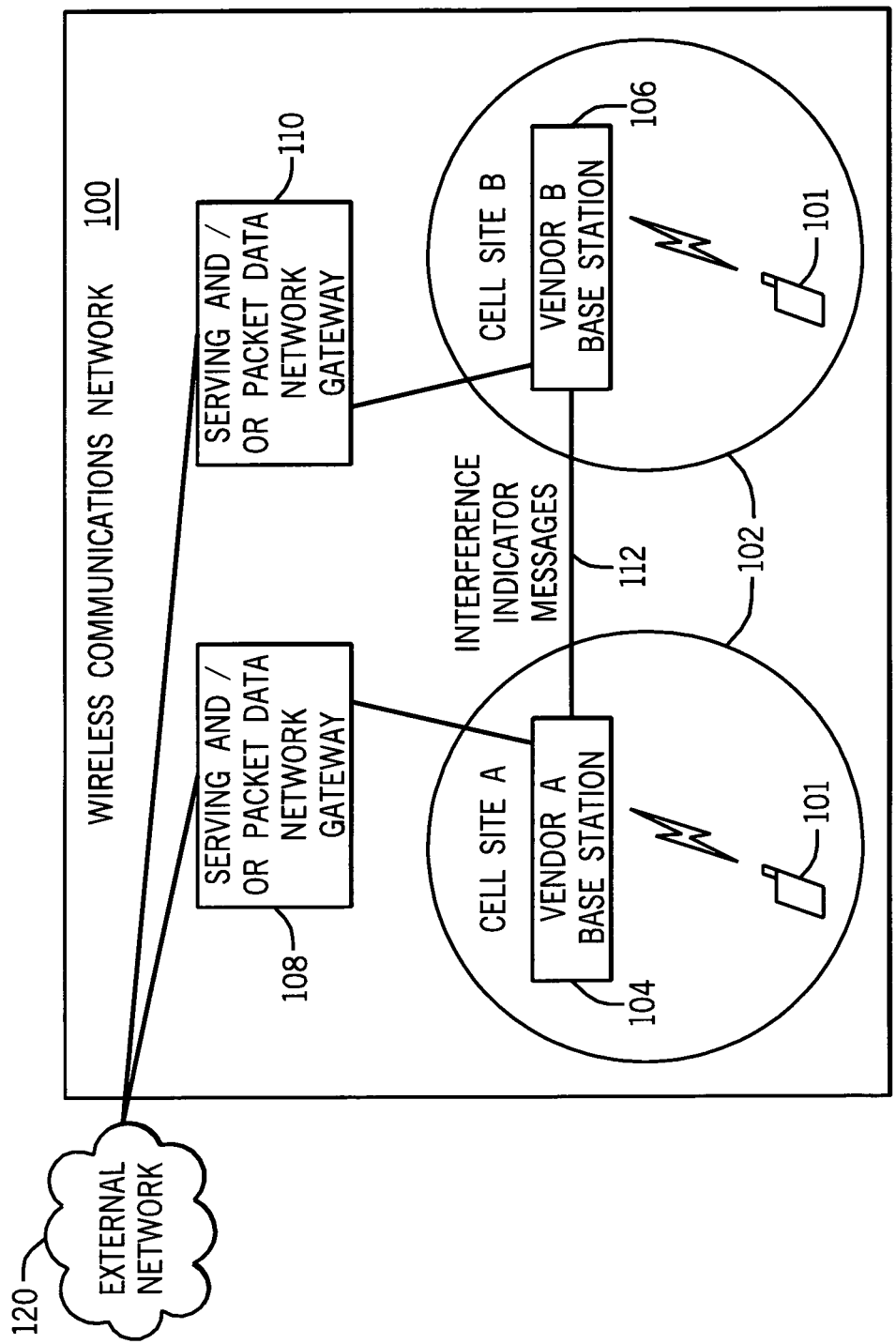
FIG. 1 is a block diagram of an example wireless communications network that includes equipment from multiple vendors, in which an inter-cell mitigation mechanism according to some preferred embodiments is implemented.

FIG. 1 illustrates an example of a wireless communications network 100 that is operated by a service provider. The wireless communications network 100 includes multiple cell sites 102, with cell site A and cell site B depicted in the example of FIG. 1. It is noted that a typical wireless communications network would include many cell sites distributed throughout a particular country or throughout the world or other geographic region.

As shown in FIG. 1, cell site A includes a vendor A base station 104, while cell site B includes a vendor B base station 106. The base stations 104, 106 communicate wirelessly with mobile stations 101 located in the respective cell sites A and B. In some embodiments, the wireless communications technology that is used by the cell sites 102 shown in FIG. 1 is according to the EUTRA (Evolved Universal Terrestrial Radio Access) standard from 3GPP (Third Generation Partnership Project). EUTRA is also referred to as Long Term Evolution (LTE). EUTRA is designed as an enhancement of the UMTS (Universal Mobile Telecommunications System) wireless technology. As used here, reference to an EUTRA wireless communications network refers to the wireless communications network that conforms to the requirements of the EUTRA standard developed by 3GPP, as that standard currently exists or as the standard evolves over time. Note that EUTRA can refer to the current EUTRA standard, or to modifications of the EUTRA standard that are made over time. It is expected that in the future a standard that has evolved from EUTRA may be referred to by another name. It is contemplated that the term "EUTRA" as used here is intended to cover such future standards as well. In alternative preferred embodiments, wireless communications technologies according to other standards can be employed in the wireless communications network 100.

In the EUTRA context, each of the base stations 104 and 106 is an enhanced node B ("eNode B"). Each base station 104 or 106 can perform one or more of the following tasks: radio resource management, mobility management for managing mobility of mobile stations, routing of traffic, and so forth. More generally, the term "base station" can refer to a cellular network base station, an access point used in any type of wireless network, or any type of wireless transmitter to communicate with mobile stations. It is also contemplated that the term "base station" also refers to a femto base station or access point, a micro base station or access point, or a pico base station or access point.

The base station 104 is connected to a serving and/or packet data network or gateway 108, which terminates the user plane interface towards the enhanced node B and assumes the responsibility for packet routing and transfer towards an external network 120. The base station 106 is similarly connected to a serving and/or packet data network gateway 110. Note that the base stations 104 and 106 can be connected to the same serving and/or packet data network gateway.

The arrangement shown in FIG. 1 is provided for purposes of example. In other implementations, other network arrangements can be used.

As further shown in FIG. 1, a link 112 is provided between the vendor A base station 104 and vendor B base station 106. In the EUTRA context, the link 112 is in the form of the X2 interface, which provides a connection between eNode Bs. In alternative implementations, other types of interfaces can be provided between the vendor A base station 104 and vendor B base station 106. More generally, a "link" between base stations refers to any communications path (direct or indirect) between the base stations, where the communications path can include one or more routers, switches, gateways, and so forth.

Interference indicator messages can be exchanged between the vendor A base station 104 and the vendor B base station 106 over the link 112. Note that any one of the base stations in the wireless communications network 100 can receive interference indicator messages from multiple base stations over respective links.

Examples of the interference indicator messages include one or more of the following: relative narrowband transmit power (RNTP) indicator with respect to downlink signaling to a mobile station; an overload indicator (OI) indicator with respect to uplink signaling from the mobile station; and a high interference indicator (HII) indicator with respect to uplink signaling from the mobile station.

The RNTP indicator indicates, for each resource block (RB), whether or not a cell site intends to keep the downlink transmit power in the resource block below a certain threshold. This enables neighboring base stations to take into account the expected level of interference in each resource block when scheduling mobile stations in their own cell sites.

The high-interference indicator (HII) indicator provides information to neighboring cell sites about the part of the cell bandwidth upon which a particular cell site intends to schedule its cell-edge users. The overload indicator (OI) indicator provides information on the uplink interference level experienced in each part of the cell site bandwidth.

An EUTRA "resource block" or "RB" refers to a collection of subcarriers (of different frequencies) over some predefined time interval. Data (bearer traffic and/or control information) for transmission in the uplink or downlink is carried in the resource block, based on scheduling performed by base stations. In other implementations, other types of resources can be used to communicate data. Generally, a "resource" refers to time slot(s), frequency carrier(s), or any other assignable element that can be used to carry data.

Figure 2:
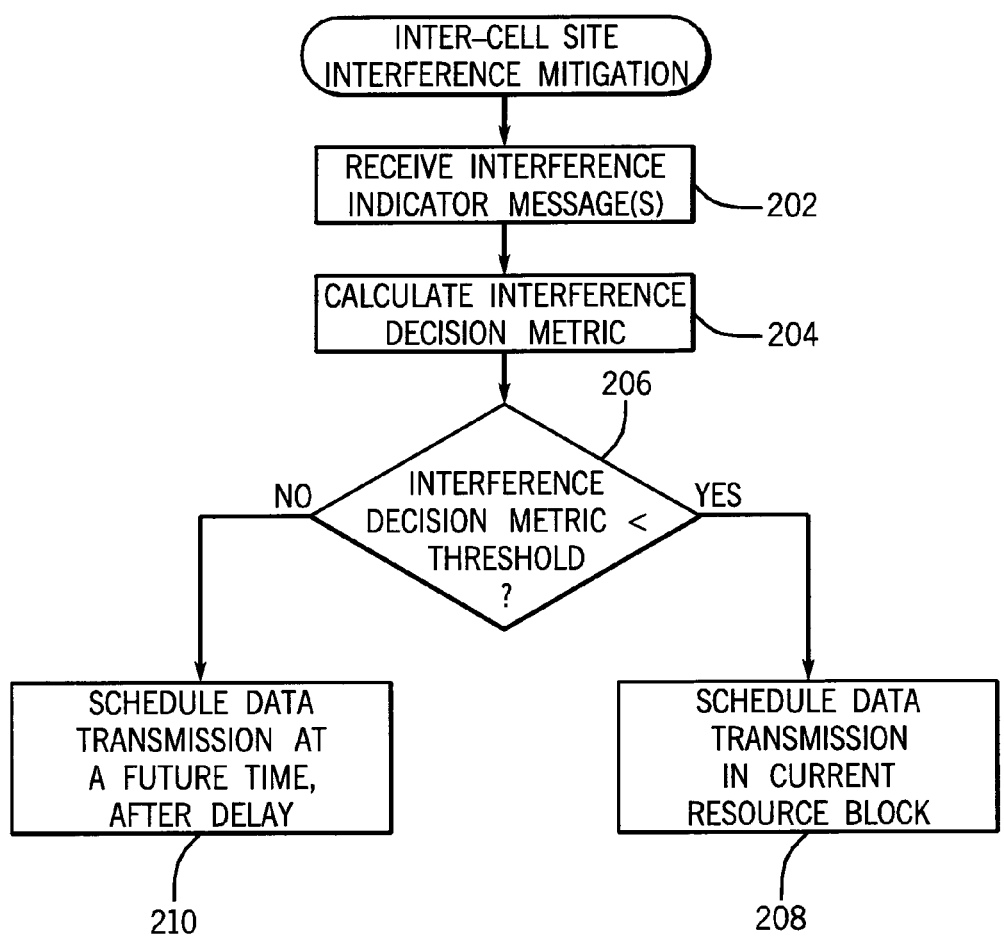
FIG. 2 is a flow diagram of a process of performing inter-cell interference mitigation in a wireless communications network that includes equipment from multiple vendors, in accordance with some preferred embodiments.

FIG. 2 is a flow diagram of a process of performing inter-cell site interference mitigation. Note that the "data transmission" can refer to either data transmission on the downlink (from the base station to the mobile station) or on the uplink (from the mobile station to the base station). It is assumed that the process of FIG. 2 is performed by the vendor A base station 104 in FIG. 1. However, note that the same procedure can be performed by the vendor B base station 106.

The vendor A base station 104 receives (at 202) one or more interference indicator messages. The one or more interference indicator messages can be received from the vendor B base station 106, or from the vendor B base station 106 and one or more other base stations. More generally, the vendor A base station 104 receives one or more interference indicator messages from neighboring base station(s). In some implementations, the neighboring base station(s) that can send interference indicator message(s) to the vendor A base station 104 is (are) the base station(s) that are part of the active set of a particular mobile station 101. The active set of base stations associated with a mobile station 101 refers to the base stations to which the mobile station can be handed off.

Based on the received interference indicator message(s), the vendor A base station 104 calculates (at 204) an interference decision metric. The interference decision metric can be a weighted sum (or other type of weighted aggregate) of all the interference indicators received from the neighboring base stations, for both the uplink and downlink. For example, the interference indicators include RNTP indicators, overload indicators, and high interference indicators. Calculating a weighted sum refers to summing products of interference indicator values and respective weights, such as in the following manner:

Interference Decision Metric=$\Sigma_i w_i \cdot I_i$, where i=1 to N (N being the number of neighboring base stations), and $w_i$ represents a weight to be applied to the value of the interference indicator $I_i$ (received from neighboring base station interference indicator i). The interference indicator $I_i$ can be an RNTP bit, a high interference indicator bit, or overload indicator bit, for example.

The weights that are applied to the downlink and uplink interference indicators are optimized based on the relative distances between the base stations (distance between vendor A base station and each neighboring base station) and wireless channel conditions (wireless channel condition between vendor A base station and each neighboring base station). A wireless channel condition can be measured using one of various indicators, such as a channel quality indicator (CQI), sounding reference signal (SRS), MIMO (multiple input, multiple output) precoding metric indicator (PMI) measurements, and so forth. PMI refers to an index to enable selection of a precoding vector (codeword) to be applied to wireless transmissions. Different values of PMI select different codewords for coding wireless transmissions. CQI is an indication of wireless channel quality between a base station and a mobile station. The sounding reference signal (SRS) is a reference signal sent by the mobile station to enable the base station to determine which path the mobile station will be using for uplink data.

The weighted sum (or other weighted aggregate) can be calculated over a single X2 message interval or averaged over multiple X2 message intervals. An X2 message interval refers to a particular time interval in which an interference indicator message is sent between base stations. Multiple X2 message intervals refers to multiple time intervals in which corresponding interference indicator messages are sent. Averaging over multiple X2 message intervals means that the values of the interference indicator messages received in the multiple X2 message intervals are averaged.

Once the interference decision metric is calculated, it is determined (at 206) whether the interference decision metric is less than a predefined threshold. More generally, instead of determining whether the interference decision metric is less than the predefined threshold, it is determined (at 206) whether the interference decision metric has a first relationship or second relationship with respect to the threshold. Different tasks (208, 210) are performed based on the interference decision metric having different relationships with respect to the predefined threshold.

In the example of FIG. 2, if the interference decision metric is less than the predefined threshold, then the vendor A base station 104 schedules (at 208) data transmission (uplink or downlink) in a current resource block. Scheduling the data transmission in the "current" resource block refers to scheduling the data transmission in the next available resource block for the particular mobile station.

On the other hand, if the interference decision metric is not less than the threshold, the vendor A base station 104 schedules (at 210) data transmission (uplink or downlink) at a future time, after a delay ΔT. The delay ΔT can be a randomly generated latency computed in the vendor A base station 104.

Receipt of the overload indicator bit as set for a given resource block will be weighted similar to the foregoing discussion if above a given threshold. If the interference decision metric calculated based on the OI bits (weighted sum or other aggregate of OI bits) is above a given threshold, a second randomly generated latency will be applied to the scheduling of the resource block under consideration for the uplink.

Using techniques according to some embodiments, interference coverage gaps between cell sites provisioned with equipment from different vendors are addressed. The mechanism according to some embodiments is relatively simple to implement such that each vendor can implement such mechanism, while still allowing the vendor to employ their own proprietary interference mitigation algorithms.

Figure 3:
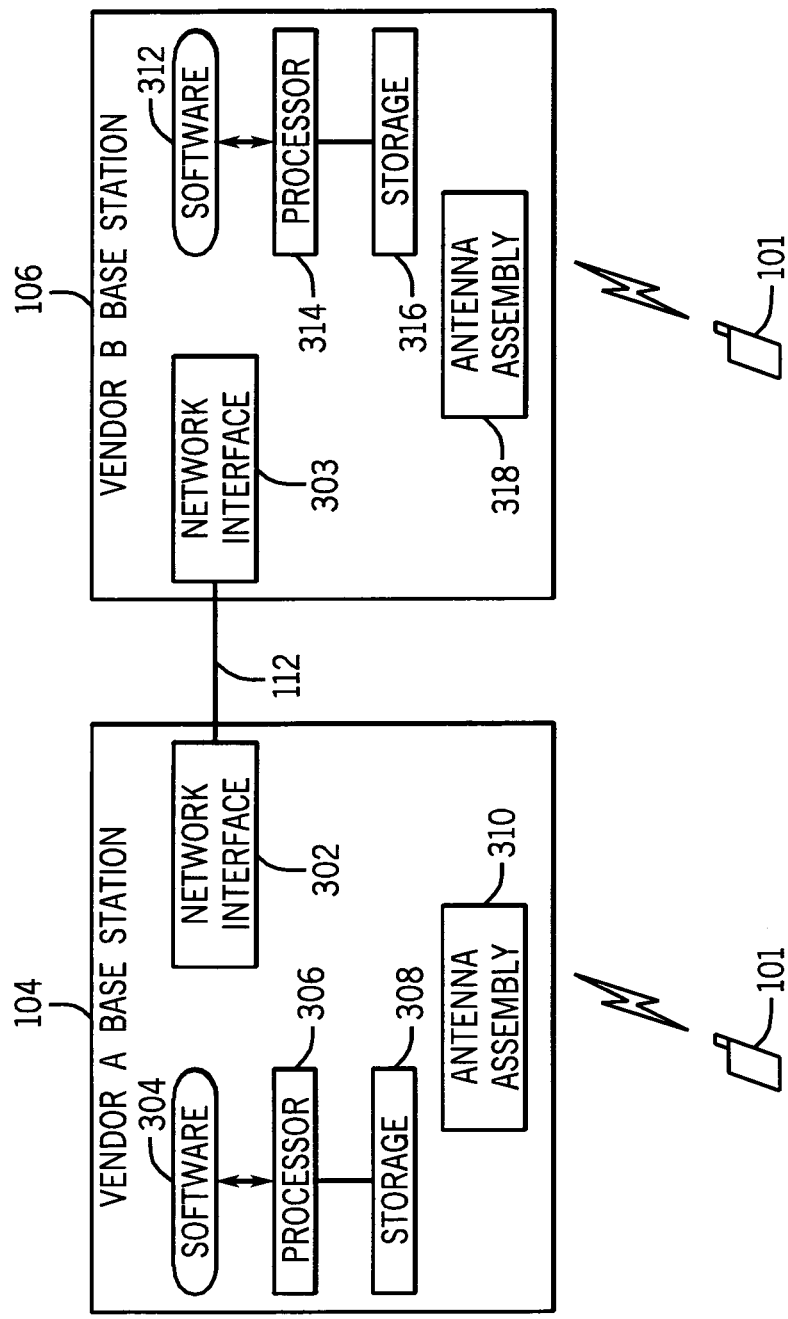
FIG. 3 is a block diagram of components in base stations from multiple different vendors, according to some preferred embodiments.

FIG. 3 is a block diagram of an example arrangement including the vendor A base station 104 and the vendor B base station 106. Each of the vendor A base station 104 and vendor B base station 106 includes a corresponding network interface 302 and 303, respectively, to communicate over the link 112. In some embodiments, in the EUTRA context, the link 112 is according to the X2 interface.

The vendor A base station 104 includes software 304 executable on a processor 306. The software 304 can include one or multiple software routines to perform various tasks associated with the vendor A base station 104. The processor 306 is connected to storage media 308, which can be implemented with disk-based storage media and/or semiconductor-based storage media.

The vendor A base station includes an antenna assembly 310 for communicating with mobile stations 101.

The vendor B base station 106 similarly includes software 312, processor 314, storage media 316, and antenna assembly 318.

Instructions of the software 304 and 312 are loaded for execution on a corresponding processor 306 or 314. The processors include microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
a first base station of a first vendor configuration;
a second base station of a second vendor configuration; and
a link between the first and second base stations,
wherein the first base station is configured to:
receive at least one interference indicator message from the second base station, and
schedule transmission of data between the first base station and a mobile station based on the at least one interference indicator message, wherein scheduling the transmission of the data between the first base station and the mobile station includes determining whether to delay transmission of the data between the first base station and the mobile station for a period of time, wherein the period of time to delay transmission of data between the first base station and the mobile station is a randomly generated delay time period; and at least one additional base station and a second link between the first base station and the at least one additional base station; wherein scheduling transmission of the data is further based on the at least one interference indicator message from the at least one additional base station wherein the first base station is further configured to:
receive at least one interference indicator message from the at least one additional base station; and
calculate an interference decision metric based on interference indicator values in the interference indicator messages;
compare the calculated interference decision metric to a threshold;
schedule transmission of the data in the current resource if the calculated interference decision metric has a first relation to the threshold; and
delay transmission of the data if the calculated interference decision metric has a second, different relation to the threshold.

2. The system of claim 1, wherein the current resource is a current resource block.

3. The system of claim 1, wherein the interference decision metric is calculated by performing a weighted aggregate based on the interference indicator values and weights assigned to the respective interference indicator values.

4. The system of claim 3, wherein the first base station is configured to further:
calculate the weights based on conditions between the first base station and respective ones of the second base station and the at least one additional base station.

5. The system of claim 4, wherein the conditions include one or more of (1) corresponding distances between the first base station and respective ones of the second base station and the at least one additional base station, and (2) channel conditions of wireless channels between the first base station and respective ones of the second base station and the at least one additional base station.

6. The system of claim 1, wherein the data to be scheduled for transmission is one of uplink data and downlink data.

7. The system of claim 1, wherein the first and second base stations are configured to operate according to an EUTRA (Evolved Universal Terrestrial Radio Access) standard.

8. A method comprising:
receiving, by a first base station of a first vendor configuration, at least one interference indicator message from a second base station of a second vendor configuration;
calculating, by the first base station, an interference decision metric based on the at least one interference indicator message; and
scheduling transmission of data between the first base station and a mobile station based on the interference decision metric, including determining, based on the interference decision metric, whether to delay transmission of the data between the first base station and the mobile station for a period of time, wherein the period of time to delay the transmission of the data between the first base station and the mobile station is a randomly generated delay time period; wherein scheduling the transmission of data comprises:
scheduling transmission of data in a current resource if the interference decision metric has a first relation to a predefined threshold; and
delay transmission of the data by a predetermined delay if the interference decision metric has a second relation to the predefined threshold.

9. The method of claim 8, further comprising:
receiving at least another interference indicator message from at least a third base station,
wherein calculating the interference decision metric comprises calculating a weighted aggregate based on indicator values in the received interference indicator messages.

10. The method of claim 9, wherein calculating the weighted aggregate comprises calculating an aggregate of products of indicator values with respective weights.

11. The method of claim 10, further comprising:
calculating the weights based on conditions between the first base station and each of the second and third base stations.

12. The method of claim 8, wherein the first and second base stations are configured to operate according to an EUTRA (Evolved Universal Terrestrial Radio Access) standard.

13. A first base station of a first vendor configuration, comprising:
a network interface to a link to a second base station of a second vendor configuration;
a processor configured to:
receive at least one interference indicator message from the second base station;
calculate an interference decision metric based on the at least one interference indicator message; and
schedule transmission of data between the first base station and a mobile station based on the interference decision metric, including determining whether to delay transmission of the data between the first base station and the mobile station for a period of time, wherein the period of time to delay transmission of the data between the first base station and the mobile station is a randomly generated delay time period;
schedule transmission of data in a current resource if the interference decision metric has a first relation to a predefined threshold; and
delay transmission of the data by a predetermined delay if the interference decision metric has a second relation to the predefined threshold.

14. The first base station of claim 13, wherein the processor is configured to further:
receive at least another interference indicator message from a third base station of the second vendor configuration,
wherein the interference decision metric is calculated based on the interference indicator messages from the second base station and the third base station.

15. The first base station of claim 13, wherein the first base station is configured to operate according to an EUTRA (Evolved Universal Terrestrial Radio Access) standard.

* * * * *